United States Patent [19]

Gänssmantel

[11] 4,004,225
[45] Jan. 18, 1977

[54] METHOD FOR SYNCHRONIZING THE PULSE FRAMES IN TIME MULTIPLEX DATA TRANSMISSION VIA COMMUNICATION SATELLITES

[75] Inventor: Horst Gänssmantel, Backnang, Germany

[73] Assignee: Licentia Patent-Verwaltungs-G.m.b.H., Frankfurt am Main, Germany

[22] Filed: May 20, 1975

[21] Appl. No.: 579,254

[30] Foreign Application Priority Data

May 21, 1974 Germany .................... 2424674

[52] U.S. Cl. ............................ 325/4; 325/2; 325/58; 178/69.1; 179/15 BS
[51] Int. Cl.² ........................... H04B 7/26
[58] Field of Search ............... 325/2, 4, 58; 179/15 BS, 15 BA; 178/69.5 R

[56] References Cited
UNITED STATES PATENTS

| | | | |
|---|---|---|---|
| 3,418,579 | 12/1968 | Hultberg | 325/4 |
| 3,761,814 | 9/1973 | Bernasconi et al. | 325/4 |
| 3,858,007 | 12/1974 | Gänssmantel | 179/15 BS |
| 3,878,339 | 4/1975 | Maillet | 325/4 |

Primary Examiner—Robert L. Griffin
Assistant Examiner—Jin F. Ng
Attorney, Agent, or Firm—Spencer & Kaye

[57] ABSTRACT

A data transmission system for the transmission of time multiplex data between a plurality of stations via the transponder of a communications satellite wherein each pulse frame includes a code sequence (SRUW) periodically transmitted by a reference station and which can be used for synchronization by the other stations, and pulse bundles transmitted by a predetermined sequence by the other station. A plurality of the stations are utilizable as reference stations but only one is active. Each of the stations which can be used as a reference station periodically transmits its own code sequence at the beginning of successive pulse frames, with the reference stations being synchronized with the coded sequence from the active reference station and the other stations being synchronized with the coded sequence of any of the reference stations. Upon a malfunction in the system so that the coded sequence from the active reference station cannot be received by the other reference stations, the one of the reference stations which is active is changed.

2 Claims, 1 Drawing Figure

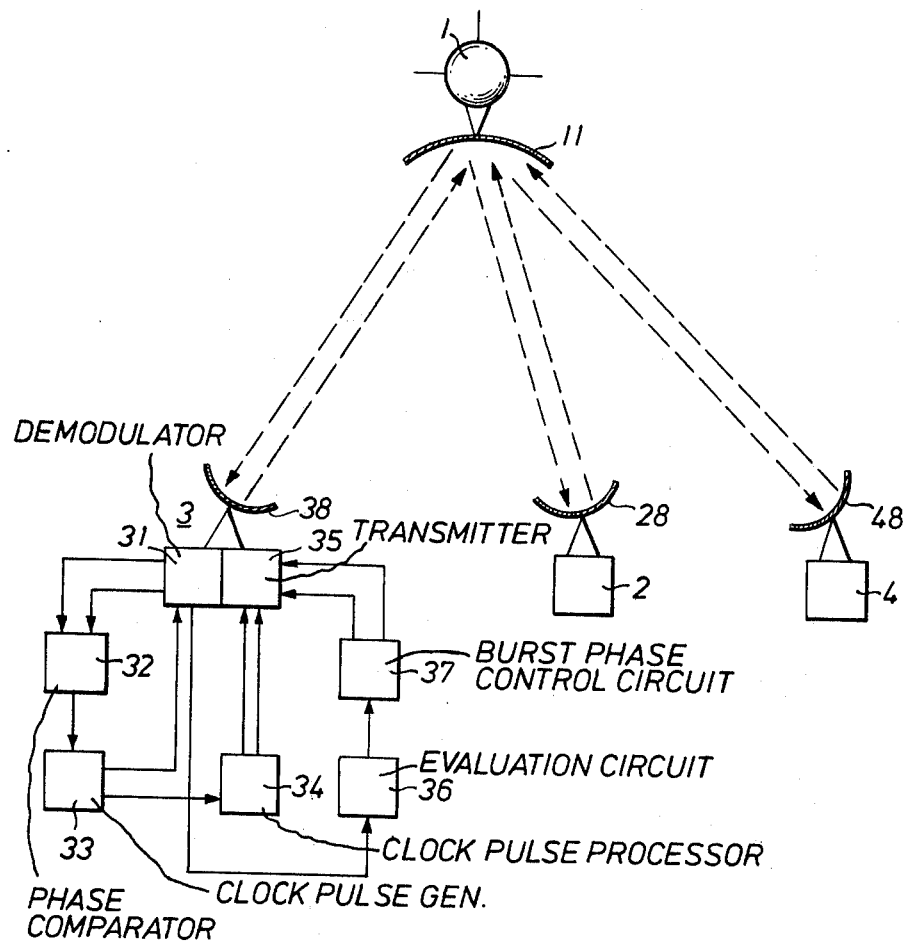

METHOD FOR SYNCHRONIZING THE PULSE FRAMES IN TIME MULTIPLEX DATA TRANSMISSION VIA COMMUNICATION SATELLITES

BACKGROUND OF THE INVENTION

It is known that it is possible to exchange data simultaneously between a plurality of ground stations through a relay station, for example, the transponder of a communications satellite, where the transponder amplifies the sum signal from all presently transmitting ground stations received by its antenna in a limited frequency band and retransmits them in another frequency band. Such a system is described for example, in the article by Schwartz, Aein, Kaiser, "Modulation Techniques for Multiple Access to a Hard-Limiting Satellite Repeater", Proc. IEEE, Vol. 54, No. 5, May 1966, pages 763–777. The time multiplex process (TDMA) can be used for such multiple transmission in that each ground station has associated to it a pulse bundle, a so-called burst, within a periodically repeated pulse frame. The times at which these bursts are transmitted are controlled in the respective ground stations so that the bursts arrive at the satellite, taking into consideration of their travel times to the satellite, in a prescribed sequence one after the other behind a reference burst, the so-called code sequence SRUW (synchronization reference unique word), which is transmitted by a reference station. For a control of the position of the transmitted bursts relative to the beginning of the frame established by the code sequence SRUW, it is a prerequisite that all transmitting stations can receive the code sequence SRUW as well as their own transmitted burst from the satellite without interference. If the reception of the code sequence is prevented by malfunctions of instruments or as a result of bad weather conditions, the transmission of the code sequence SRUW must be taken over by another ground station which thus becomes the reference station.

In known communications systems of this type three of the intended ground stations, for example, which are disposed at different locations within the radiation range of the satellite antenna are equipped to operate as reference stations. However, only one station can be effective as the reference station at any one time to determine the synchronism of the entire system. A change between these stations is initiated as soon as the code sequence SRUW cannot be received by one or more of the ground stations. Another station which, due to its momentarily favorable characteristics, for example a favorable signal to noise ratio, seems suitable, then becomes the reference station.

Systems of that type are still under investigation and have been published for example in the conference digest of "International Conference on Digital Satellite communications" Nov. 69 London and "L' Espace et la Communication" Paris 1971 Section 22.

In order to accomplish this change from one reference station to another information must be exchanged between the stations over a signal channel. However, the signal channel required for this purpose might be that information channel which is malfunctioning so that lack of synchronization cannot be prevented. Particularly when high transmitting and receiving frequency ranges are employed, it may happen that local atmospheric interference adversely influences reception of the code sequence SRUW transmitted by a certain reference station.

SUMMARY OF THE INVENTION

It is the object of the present invention to avoid limiting the periodic emission of the frame reference, i.e., the transmission of the code sequence SRUW, to a single reference station so that in the case of malfunction of one reference station the synchronism between the other stations, and thus the exchange of data, is assured to continue without interruption.

The above object is achieved according to the present invention in that in a system as described above, each of the stations utilizable as a reference station transmits its own code sequence in successive pulse frames and in the event of a malfunction, the one of the reference staions which is active is changed.

This produces the advantage that operating malfunctions due to adverse weather conditions or as a result of elimination of the active reference station which determines the synchronization, will not occur. All stations intended as potential reference stations periodically transmit their own code sequence. The successive frames each begin with a code sequence. If, for example, three potential reference stations are provided, each of these potential reference stations sends its code sequence at the beginning of every third frame. Only one of these stations still acts as the active reference station while the two other stations synchronize the phase of their code sequences to the code sequence SRUW of the active reference station. All other stations can utilize any of the code sequences they wish for the regulation or synchronization of their own transmitting bursts. When there is a change from one active reference station to a new active reference station, the new active reference station need not start up a new complete code sequence since sufficient synchronization information already is available to keep the bursts in their channel windows with the code word of the new active reference station. The new active reference station need only change its oscillator to its free running state by opening its phase synchronization loop.

BRIEF DESCRIPTION OF THE DRAWINGS

The FIGURE is a schematic diagram of a data communication system according to the invention.

DETAILED DESCRIPTION OF THE PREFERRED EMBODIMENTS

Referring now to the FIGURE there is shown a communications satellite 1 which includes a transponder (not shown) having an antenna 11 which covers in its radiation range a number of ground stations, for example, stations 2, 3 and 4. All of these three stations are assumed to be equipped to be able to become active as reference stations. Since there are three active or potentially active reference stations the code sequence SRUW is transmitted according to the invention at the beginning of every third frame by the presently active reference station, for example station 2. The code sequence SRUW which includes the sync word and a code word identifying the particular station is determined by the clock pulse generator of station 2. The code sequence SRUW from active reference station 2 is received, via satellite 1, in all of the ground stations, including the stations 3 and 4, together with the bursts transmitted by these stations. Stations 3 and 4 synchronize their own clock pulse generators to the code sequence SRUW transmitted by station 2 and themselves emit their own code sequences in the following frames. Since these code sequences of stations 3 and 4 are synchronized with the code sequence SRUW of the active reference station 2, all other stations of the communications system can synchronize their own clock pulse generators to any desired one or more of the code sequences from the three potentially active reference stations.

As an example of the operation of the system station 3 receives via its antenna 38, the pulse frames transmitted by the main transponder of satellite 1, which frames include the code sequences SRUW, i.e., its own code sequence as well as the transmitted bursts, and feeds the received pulse frames to a demodulator 31 which demodulates the received signal to derive the code sequence of the reference station 2 and its own code sequence. In phase comparison circuit 32 connected to the outputs of demodulator 31, a control voltage is obtained which is proportional to the clock pulse difference of the two code sequences and this control voltage is used to regulate a clock pulse generator 33 so that the clock pulse difference between the own code sequence in the main transponder and the reference code sequence SRUW from active station 2 tends towards zero in order to synchronize the systems. This synchronization may also be extended to the transmitted bursts so that in the synchronized state the system may operate with synchronized bit timing. For this purpose the clock pulses of the continuously regulated clock pulse generator 33 are fed to a clock pulse processor 34 which produces the intermediate clock pulses necessary for the frame division. The thus derived clock pulse frequencies are fed in a known manner to the modulation and transmitting system 35. If a small loss of synchronization accuracy is acceptable, bit timing synchronization need not be provided. Furthermore, as is also well known, every station has an evaluation circuit 36 for the signalling channel of the transponder as well as a burst phase control circuit 37 which compensates for changes in travel time resulting from relative movement between the satellite and the stations by producing corresponding changes in the burst phase. The circuits contained in blocks 35, 36, 37 are similar or even identical to those which are used in the known Comsat TDMA Systems or the German TDMA System. Comsat circuit diagrams are published for example in BG-1-18 EW/3/73 (Rev.2), BG/T-1-11E W14/73 (Rev.2). A station for a system of the type to which the present invention is directed, including blocks 34–37 is likewise disclosed in applicant's U.S. Pat. No. 3,858,007, issued Dec. 31st, 1974.

During operation, it may happen that one or a plurality of stations in the system lose reception of the code sequence SRUW. If the station losing reception is not one of the potential reference stations, then it merely need change its synchronization to the code sequence transmitted, in the next-following frame. If, however, it is one of the potential reference stations which notices a loss of the code sequence SRUW from the active reference station, another reference station must become active. Then the malfunction must be acknowledged over the signalling channel. The new reference station is then activated in that it opens its synchronization loop passing through devices 31, 32, 33 and sets its clock pulse generator 33 to the free running state. Meanwhile the previously active reference station must close its phase synchronization loop and synchronize its code sequence to the clock pulse of the code sequence SRUW from the new active reference station.

It will be understood that the above description of the present invention is susceptible to various modifications, changes and adaptations, and the same are intended to be comprehended within the meaning and range of equivalents of the appended claims.

What is claimed is:

1. A method for synchronizing the pulse frames occurring during the transmission of time multiplex pulse coded data between the stations of a multi-station communication system via the transponder of a communications satellite in which each pulse frame includes a code sequence (SRUW) periodically transmitted by one of the stations which functions as a reference station and pulse bursts transmitted in a prescribed sequence by the other stations of the system, and wherein a plurality of the stations of the system, which plurality is less than the total number of stations of said system, are utilizable as active reference stations with only one station of said system being an active reference station at any time, comprising: causing all of said stations utilizable as reference stations to periodically transmit their own code sequences (SRUW) at the beginning of successive pulse frames; synchronizing the coded sequence from each of said stations utilizable as reference stations with the coded sequence of the presently active reference station; synchronizing the time of transmission of the pulse bursts of the other stations of said system with the code sequence of any one of said stations utilizable as a reference station; and in the event of malfunction whereby the coded sequence from the presently active reference station is not received by the stations utilizable as a reference station, changing the one of said stations utilizable as a reference station which operates as the active reference station.

2. A method as defined in claim 1 wherein each of said stations utilizable as a reference station includes a clock pulse generaor and a phase synchronization loop responsive to the received coded sequence from the active reference station for controlling the clock pulse generator; and wherein said step of changing includes interrupting the phase synchronization loop of the station which is to be made the active reference station.

* * * * *